— 
United States Patent Office 3,233,408
Patented Feb. 8, 1966

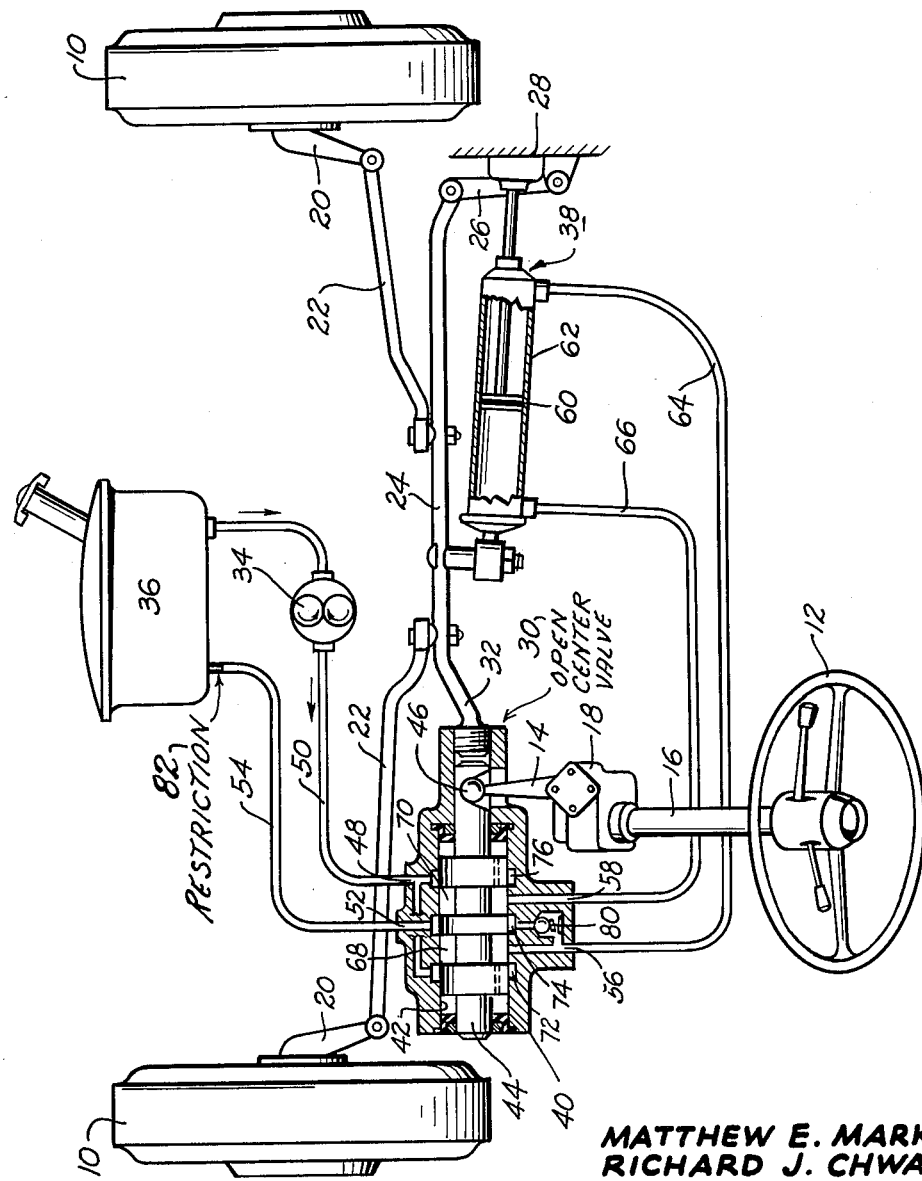

---

3,233,408
POWER STEERING MECHANISM
Matthew E. Markert, Richard J. Chwalek, and Donald A. Steszewski, South Bend, Ind., assignors to The Bendix Corporation, South Bend, Ind., a corporation of Delaware
Filed Nov. 6, 1964, Ser. No. 409,453
3 Claims. (Cl. 60—52)

This invention relates to a power steering system and more particularly to a method of suppressing noise in a hydraulic power steering system.

Many methods of noise reduction or suppression in a hydraulic power steering system have been utilized in the past with various degrees of success. However, none of these methods have completely satisfied the vehicle manufacturers and customers.

One of the reasons for the lack of success in this area is because of the difficulty in determining the source and cause of the objectionable noises.

After extensive studies of various power steering systems, it has been determined that the objectionable hydraulic noises result because of a relative vacuum which occurs during certain turning maneuvers on one side or the other, particularly the rod side, of the power cylinder piston. More specifically, it has been found that during certain turning maneuvers the pressure in the non-pressurized side of the power cylinder becomes less than the return pressure, in effect creating a relative vacuum, and that the collapse of such vacuum results in a noise being emitted from parts of the hydraulic system. In essence this noise is related to hydraulic hammer.

Accordingly, it is an object of this invention to provide means for eliminating or substantially reducing these objectionable hydraulic noises by preventing the occurrence of such vacuums.

Another object of this invention is to provide means for eliminating such objectionable noises by supercharging a reverse check valve, which check valve communicates the non-pressurized side of the power cylinder to the return line, with a back pressure addition.

More specifically, it is an object of this invention to provide means for eliminating such objectionable noises by inserting a check valve in the hydraulic system so that an unrestricted flow of fluid is available from the low pressure, or return, side of the system to the non-pressurized side of the hydraulic cylinder in the event that the pressure of the non-pressurized side of the cylinder becomes less than the return pressure. Such a check valve in conjunction with a restriction in the return line for increasing the return pressure has been found to substantially reduce, if not completely eliminate the objectional noises of a hydraulic power steering system.

The above and other objects and features of this invention will be apparent from the following description taken in connection with the accompanying drawing which forms a part of this disclosure.

Refering to the drawing, it will be seen that numeral 10 designates the front wheels of a vehicle to be steered by rotation of a steering wheel 12 which is suitably connected to the pitman arm 14 through steering column 16 and gear box 18. The steering linkage includes spindle arms 20, the rods 22, a cross tie rod 24, and an idler arm 26 which is suitably pivoted at one end to the vehicle frame 28.

The hydraulic system of the power steering mechanism includes a conventional spool type open center control valve 30 which is connected to the threaded end 32 of the cross tie rod, a pump 34, a reservoir 36, and a fluid motor 38 which is connected between the cross tie rod 24 and frame 28, as shown in the drawing. The control valve includes a housing 40 having a bore 42 therein and a valve spool member 44 movable within said bore. The valve spool is operatively connected to the pitman arm 14 through a ball stud 46 which causes movement of the spool in opposite directions from a normally neutral or center position to control flow in the hydraulic system. The valve housing 40 includes an inlet port 48 which communicates with the pump via conduit 50, an outlet port 52 which communicates with the reservoir via conduit 54, and cylinder ports 56 and 58. A piston 60 divides cylinder 62 into opposed chambers constantly communicating respectively with cylinder ports 56 and 58 via conduits 64 and 66. Formed on the valve spool 44 are two annular cylinder grooves 68 and 70 which communicate with cylinder ports 56 and 58, respectively. The bore 42 of the valve housing is provided with annular grooves 72, 74 and 76. Annular return groove 74 communicates with the outlet port 52, while annular pressure grooves 72 and 76 communicate with inlet port 48.

Operation of the power steering system will be in the conventional manner. Specifically, rotation of the steering wheel will cause movement of the spool member in one direction or the other, depending on the direction of rotation of the steering wheel. Such spool movement will then cause pressurization of one of the opposed chambers located in power cylinder 62 to provide the desired power assist during steering.

In order to eliminate the effective vacuum which arises in the rod side chamber of the power cylinder during certain steering maneuvers, the collapse of which is instrumental in producing noise, a reverse check valve 80 is located in the valve housing 40. This check valve communicates the annular return groove 74 with the cylinder port 56 so that, if the pressure in the rod side chamber becomes less than the return pressure in conduit 54, reverse fluid flow therebetween will be permitted. In order to super charge the reverse check valve 80 and render it more effective a back pressure addition of about 20 p.s.i. is accomplished by inserting a restriction 82 in the return line between the check valve mentioned and the reservoir. Although this restriction is shown in the drawing as being preferably adjacent the reservoir in order to obtain an "accumulator effect" which will result through swelling of the conventional rubber hose, acceptable results may be achieved by placing the restriction in the valve housing at outlet port 52. Furthermore, although, the drawing only shows a simple check valve for controlling the rod side of the power cylinder, it will be understood by those skilled in the art that if desired, both chambers in the power cylinder may be controlled by check valves in a similar manner.

The several advantages which flow from this invention are believed to be obvious from the above description, and other advantages may suggest themselves to those who are familiar with the art to which the invention relates.

Furthermore, although this invention has been described in connection with a specific embodiment, as pointed out above, it will be obvious to those skilled in the art that various changes may be made in the form, structure, and arrangement of parts without departing from the spirit of the invention. Accordingly, we do not desire to be limited to the specific embodiment disclosed herein primarily for purposes of illustration, but instead desire protection falling within the scope of the appended claims.

Having thus described the various features of the invention, what we claim as new and desire to secure by Letters Patent is:

1. In a hydraulic system, the combination of a pump, a reservoir, a supply conduit communicating with said pump, a return conduit communicating with said reservoir, a power cylinder having a piston separating a pair of oppositely disposed chambers, one of which is a pressurized chamber communicating with said supply conduit and the other of which is a non-pressurized chamber communicating with said return conduit, a control valve interposed between said conduits and said chambers for selectively communicating one of said chambers with one of said conduits and the other of said chambers with the other of said conduits, means for permitting reverse flow from said return conduit to said non-pressurized chamber when the pressure in said non-pressurized chamber becomes less than the pressure in said return conduit regardless of the position of said control valve, said means for permitting reverse flow including a reverse check valve located in said control valve, and a restriction interposed between said reservoir and said reverse check valve for increasing the return pressure acting on said check valve.

2. The combination, as defined in claim 1 wherein said restriction is located in said return conduit.

3. In a hydraulic system, the combination of a pump, a reservoir, a supply conduit communication with said pump, a return conduit communicating with said reservoir, a power cylinder having a piston separating a pair of oppositely disposed chambers, one of which is a pressurized chamber communicating with said supply conduit and the other of which is a non-pressurized chamber communicating with said return conduit, a control valve interposed between said conduits and said chambers for selectively communicating one of said chambers with one of said conduits and the other of said chambers with the other of said conduits, said control valve comprising a housing having a bore therein, an inlet port communicating with said supply conduit, an outlet port communicating with said return conduit, and two cylinder ports, one of which communicates with said pressurized chamber and the other of which communicates with said non-pressurized chamber, a spool member slidable in said bore for controlling flow between said ports, a plurality of overlapping annular grooves formed in said bore and on said spool member, one of which constitutes a return annular groove continuously communicating with said outlet port, passage means located in said housing for continuously communicating said return annular groove with the cylinder port communicating with said non-pressurized chamber, and means located in said passage means for permitting reverse flow from said return conduit to said non-pressurized chamber when the pressure in said non-pressurized chamber becomes less than the pressure in said return conduit regardless of the position of said control valve.

References Cited by the Examiner

UNITED STATES PATENTS

| 2,603,065 | 7/1952 | Sarto | 60—52 |
| 2,860,605 | 11/1958 | Banker | 60—52 |
| 3,159,230 | 12/1964 | Gordon | 60—52 X |

SAMUEL LEVINE, *Primary Examiner.*

EDGAR W. GEOGHEGAN, *Examiner.*